(12) United States Patent
Osaka

(10) Patent No.: US 7,978,092 B2
(45) Date of Patent: Jul. 12, 2011

(54) PORTABLE ELECTRONIC DEVICE

(75) Inventor: Masashi Osaka, Kagahara (JP)

(73) Assignee: Kyocera Corporation, Kyoto (JP)

( * ) Notice: Subject to any disclaimer, the term of this patent is extended or adjusted under 35 U.S.C. 154(b) by 374 days.

(21) Appl. No.: 12/344,332

(22) Filed: Dec. 26, 2008

(65) Prior Publication Data

US 2009/0167545 A1    Jul. 2, 2009

(30) Foreign Application Priority Data

Dec. 27, 2007 (JP) .................. 2007-336444

(51) Int. Cl.
G08B 21/00    (2006.01)
(52) U.S. Cl. .................. 340/687; 340/5.23; 340/825.38
(58) Field of Classification Search .................. 340/687, 340/686.2, 686.4, 691.6, 692, 686.1, 686.3, 340/825.19, 5.23, 825.38, 825.61
See application file for complete search history.

(56) References Cited

U.S. PATENT DOCUMENTS

| 7,085,558 B2 * | 8/2006 | Berstis et al. ................. 455/416 |
| 7,278,877 B2 * | 10/2007 | Cho ............................. 439/502 |
| 2002/0090977 A1 * | 7/2002 | Chen ............................ 455/557 |

FOREIGN PATENT DOCUMENTS

| JP | 03-239234 | 10/1991 |
| JP | 07-209723 | 8/1995 |
| JP | 08-153977 | 6/1996 |
| JP | 10-010627 | 1/1998 |
| JP | 2006-119372 | 5/2006 |

* cited by examiner

Primary Examiner — Daniel Previl

(74) Attorney, Agent, or Firm — Procopio, Cory, Hargreaves & Savitch LLP

(57) ABSTRACT

Disclosed is a portable electronic device, including: an interface unit connected to an external device; a housing provided with the interface unit; a cap placed in a location allowing for the covering of the interface unit and covering the interface unit when attached to the housing; a signal detecting line placed in the interface unit and connected to a predetermined electric potential when the external device is connected to the interface unit; a switch which electrically connects the signal detecting line to the predetermined electric potential when the cap is attached to the housing and electrically disconnects the signal detecting line from the predetermined electric potential when the cap is separated from the housing; and a control unit connected to the interface unit and configured to determine whether the signal detecting line is electrically connected to the predetermined electric potential or not.

5 Claims, 11 Drawing Sheets

# PORTABLE ELECTRONIC DEVICE

RELATED APPLICATION

The present application claims priority to Japanese patent application serial number JP2007-336444 filed on 27 Dec. 2007, which is incorporated herein by reference in its entirety.

BACKGROUND OF THE INVENTION

1. Field of the Invention

The present invention relates to a portable electronic device which gives notification of the deterioration of a waterproof function.

2. Related Art

A portable electronic device is desirably configured to have a waterproof function to avoid a malfunction or failure since it can be freely carried indoors and outdoors.

A portable electronic device has a cap or a cover through which various cables (for example, an earphone cable) are received, but it is difficult to maintain waterproof integrity in a state where a cap or a cover opens.

In order to resolve the above problem, a technique has been proposed in which a detection switch for detecting the open and closed state of a cover is provided at an opening/closing part of a cover or the like to detect the deterioration of waterproof integrity (see, for example, Japanese Patent Application Laid-Open No. 8-153977).

SUMMARY OF THE INVENTION

It is an object of the present invention to provide a portable electronic device capable of detecting an open/closed state of a cap with a simple configuration.

In order to attain the above object, one aspect of the present invention is to provide a portable electronic device, including: an interface unit connected to an external device; a housing provided with the interface unit; a cap placed in a location allowing for the covering of the interface unit and covering the interface unit when attached to the housing; a signal detecting line placed in the interface unit and connected to a predetermined electric potential when the external device is connected to the interface unit; a switch which electrically connects the signal detecting line to the predetermined electric potential when the cap is attached to the housing and electrically disconnects the signal detecting line from the predetermined electric potential when the cap is separated from the housing; and a control unit connected to the interface unit and configured to determine whether the signal detecting line is electrically connected to the predetermined electric potential or not.

DETAILED DESCRIPTION

Figure 1:
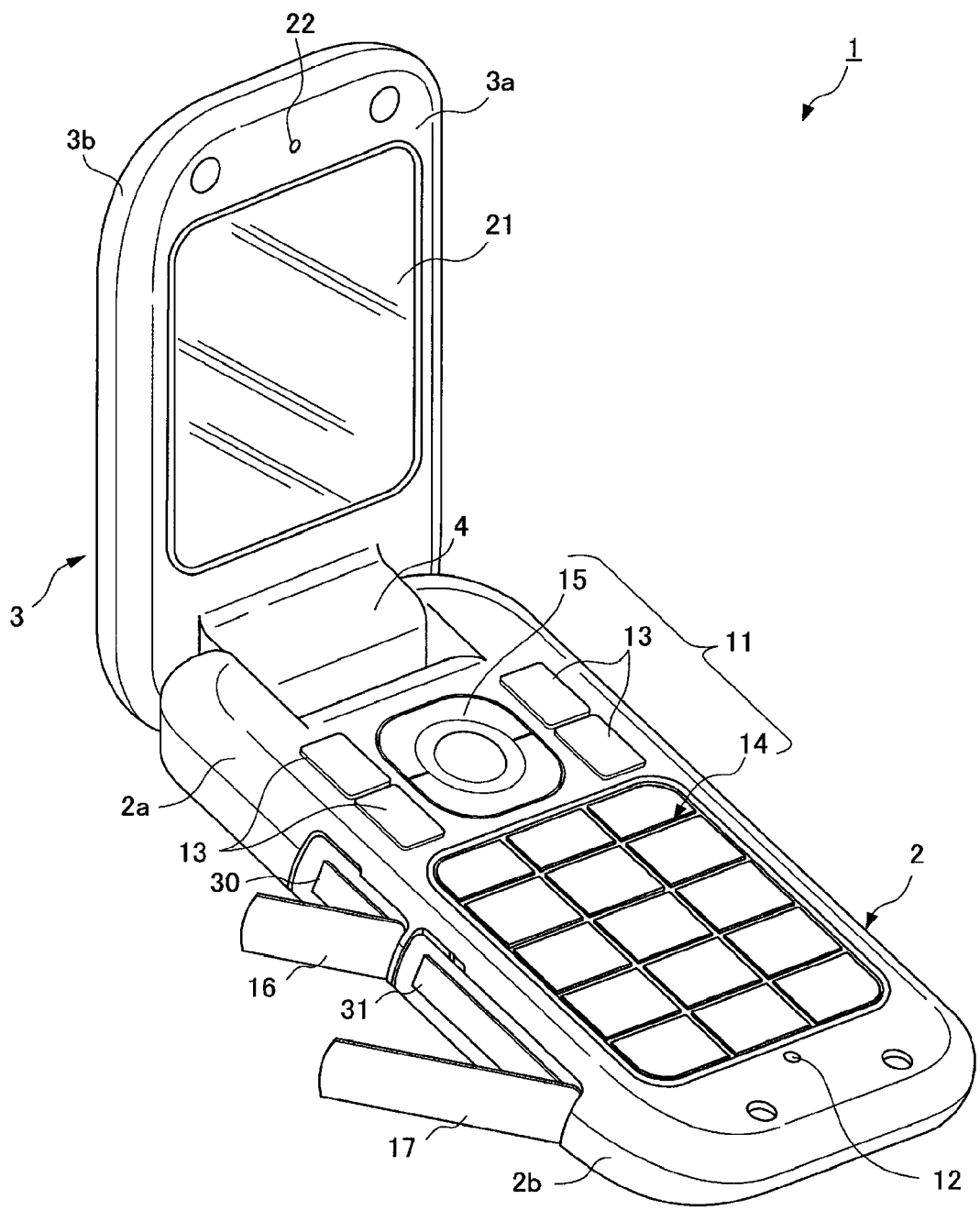
FIG. 1 is a perspective view illustrating an outline of a portable telephone device according to an exemplary embodiment of the present invention.

FIG. 1 is a perspective view illustrating an outline of a portable telephone device 1, which communicates with an external device (base station), as one example of a portable electronic device according to an exemplary embodiment of the present invention.

The portable telephone device 1 includes: an operation side housing unit 2 having a surface formed by a front case 2a and a rear case 2b; and a display side housing unit 3 having a surface formed by a front panel 3a and a rear panel 3b. The operation side case unit 2 is configured such that an operation key group 11 and a voice input unit 12, through which the voice of a user of the portable telephone device 1 during a call is input, are exposed on a surface of the front case 2a. The operation key group 11 includes a function setting operation button 13 for various settings and for operating various functions such as a telephone book function and a mail function, an input operation button 14 for inputting digits of a telephone number or letters for mail or the like, and a determination operation button 15 for performing determination in various operations or for scrolling. The operation side housing unit 2 is provided with a plurality of openings formed on its side, arranged to expose an earphone interface unit 30 which is connected to an earphone 100 and an interface unit 31 which performs communications with an external device (for example, host device) through the respective openings. Also, an earphone cap 16 attached to the opening portion to cover the earphone interface unit 30 so that the earphone interface unit 30 is not externally exposed and a cap 17 attached to the opening portion to cover the interface unit 31 so that the interface unit 31 is not externally exposed are also provided on a side of the operation side housing unit 2. The portable telephone device 1 also has a configuration capable of ensuring waterproof integrity in a state where the earphone cap 16 and the cap 17 are attached.

The earphone interface unit 30 has a signal detecting line 20a which is connected to a predetermined electric potential when the earphone cap 16 is attached.

The interface unit 31 has a signal detecting line 21a which is connected to predetermined electric potential when the cap 17 is attached.

The display side housing unit 3 is configured to show a display 21 which shows a variety of information and a voice output unit 22 which outputs the voice of a call partner on the front panel 3a.

The upper end of the operation side housing unit 2 and the lower end of the display side housing unit 3 are connected by a hinge mechanism 4 as shown in FIG. 1. Also, since the operation side housing unit 2 and the display side housing unit 3 move relative to each other through the hinge mechanism 4, the portable telephone device 1 can be in a state where the operation side housing unit 2 and the display side housing unit 3 open (open state) or in a state where the operation side housing unit 2 and the display side housing unit 3 are folded (folded state). In the exemplary embodiment of the present invention, the foldable portable telephone device 1 with the hinge mechanism 4 is described, however the present invention can be applied to other types than the foldable type such as: a slidable type, in which one case is slid from a state where the housing unit 2 is placed over the housing unit 3; a swing type, in which one housing swings about an axis line along a facing plane; a type, in which both housing 2 and 3 are connected by a two-axis hinge; or a so-called bar type, in which the operation side housing unit 2 and the display side housing unit 3 are arranged in a single housing.

Figure 2:
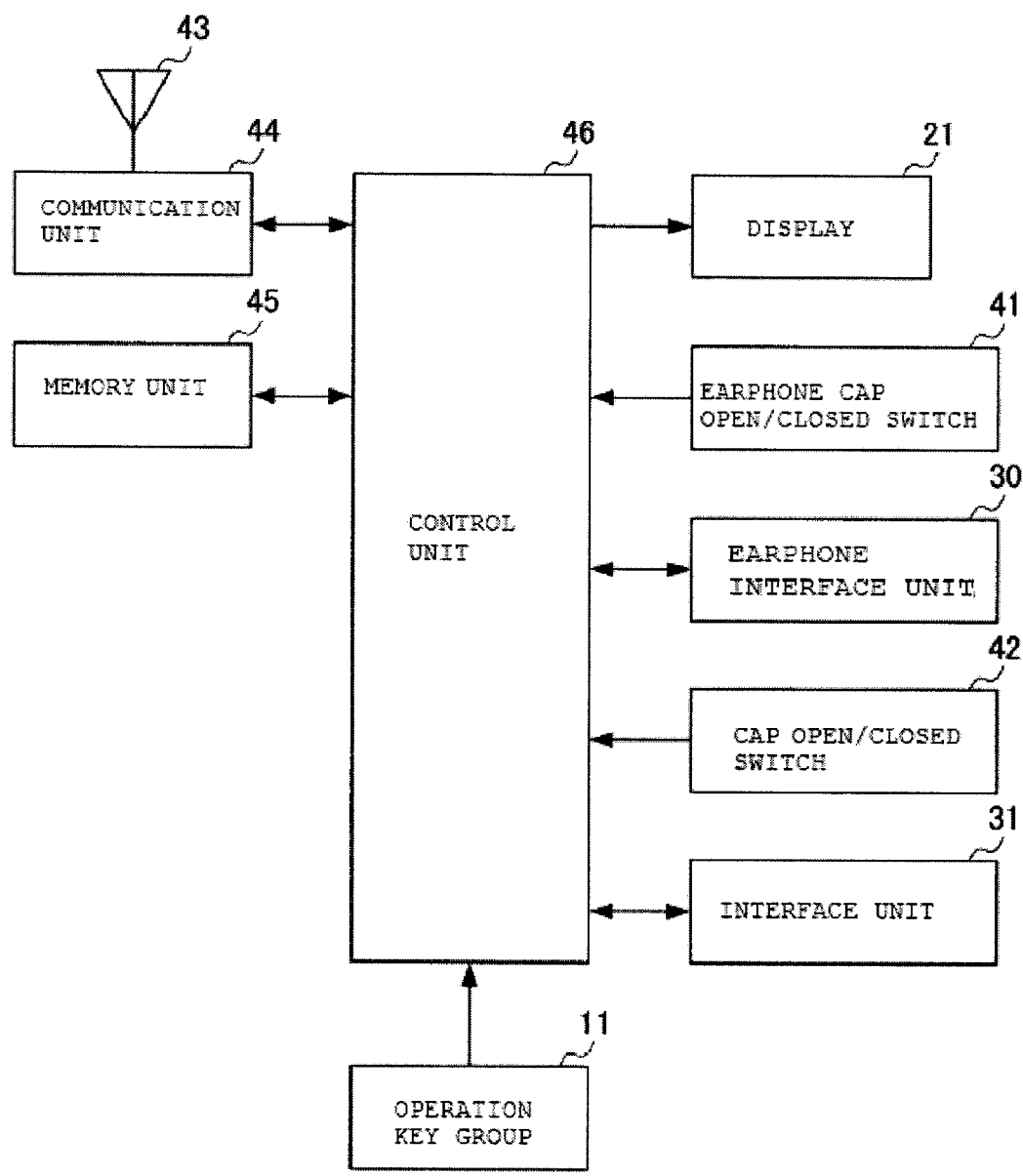
FIG. 2 is a block diagram illustrating functions of the portable telephone device according to the exemplary embodiment of the present invention.

Functions of the portable telephone device 1 will be described with reference to a functional block diagram shown in FIG. 2. As shown in FIG. 2, the portable telephone device 1 includes: the operation key group 11; the display 21 (notifying unit); an earphone cap open/closed switch 41 which detects the open/closed state of the earphone cap 16; a cap open/closed switch 42 which detects the open/closed state of the cap 17; a communication unit 44 with an antenna 43 which performs communications such as a call or a mail with an external device; a memory unit 45 which stores predetermined information; and a control unit 46 which controls respective components.

The earphone cap open/closed switch 41 performs a switching operation to electrically connect the signal detecting line 20a to a predetermined electric potential (GND) when the earphone cap 16 is attached to the earphone interface unit 30, while it performs a switching operation to electrically disconnect the signal detecting line 20a from the predetermined electric potential (GND) when the earphone cap 16 is separated from the earphone interface unit 30 so that the signal detecting line 20a is disconnected from the predetermined electric potential.

The cap open/closed switch 42 performs a switching operation to electrically connect the signal detecting line 21a to a predetermined potential (GND) when the cap 17 is attached to the interface unit 31, while it performs a switching operation to electrically disconnect the signal detecting line 21a from the predetermined electric potential (GND) when the cap is separated from the interface unit 31.

The control unit 46 is connected to the earphone interface unit 30 and the interface unit 31 to perform predetermined control when a signal is input to or is outputted from the earphone interface unit 30 or the interface unit 31.

The control unit 46 determines whether the signal detecting lines 20a and 21a are electrically connected to predetermined electric potential (GND) or not. If it is determined that the signal detecting lines 20a and 21a are not electrically connected to predetermined electric potential (GND), the control unit 46 determines it to be a state in which the earphone cap 16 or the cap 17 is separated and controls deterioration notification of the waterproof function through the display 21.

For example, when a change in the logical state (High or Low) of the signal detecting lines 20a and 21a is detected, the control unit 46 determines whether the signal detecting lines 20a and 21a are electrically connected to the predetermined electric potential (GND) or not. Here, a negative logical state (Low) indicates a state in that the earphone cap 16 or the cap 17 is attached, and a positive logical state (High) indicates a state in that the earphone cap 16 or the cap 17 is separated.

In detail, if the state of the earphone cap 16 or the cap 17 changes to a half open state or a completely open state from a completely closed state where the earphone cap 16 or the cap is attached to the side of the housing as the earphone cap 16 or the cap 17 is separated, the logical state changes so that an interrupt signal is supplied to the control unit 46. The control unit 46 detects the interrupt signal to detect that the signal detecting lines 20a and 21a are electrically connected to the predetermined electric potential (GND), which means that the earphone cap 16 and the cap 17 are in an open state.

A method for displaying a waterproof alert depending on the open/closed state of the earphone cap 16 in the portable telephone device according to the exemplary embodiment of the present invention will be described below. The earphone interface unit 30 is an earphone jack supporting both a stereo voice output and a monaural voice output.

Figure 3:
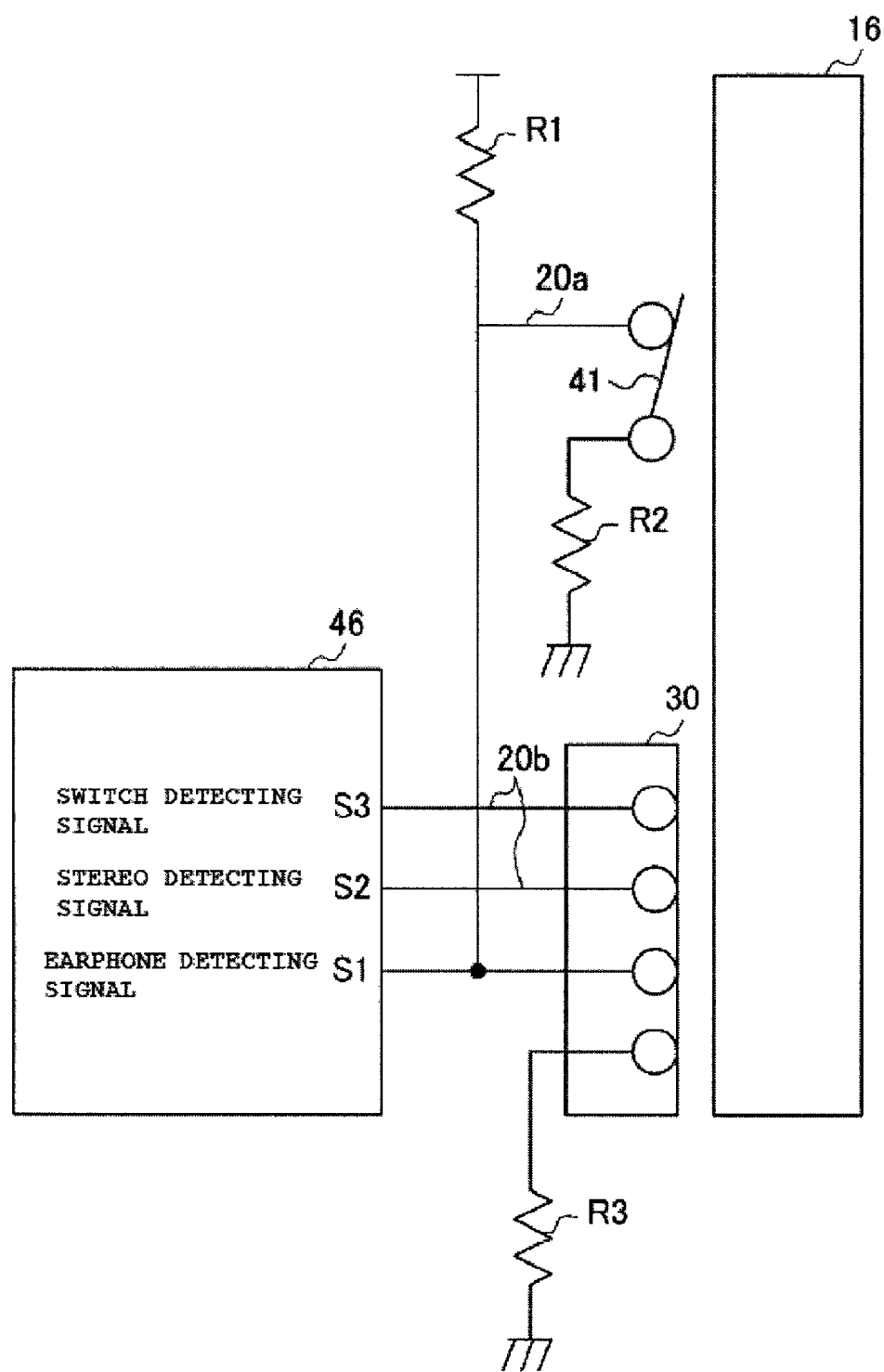
FIG. 3 is a schematic view illustrating a state where an earphone cap covers an earphone interface unit.
Figure 4:
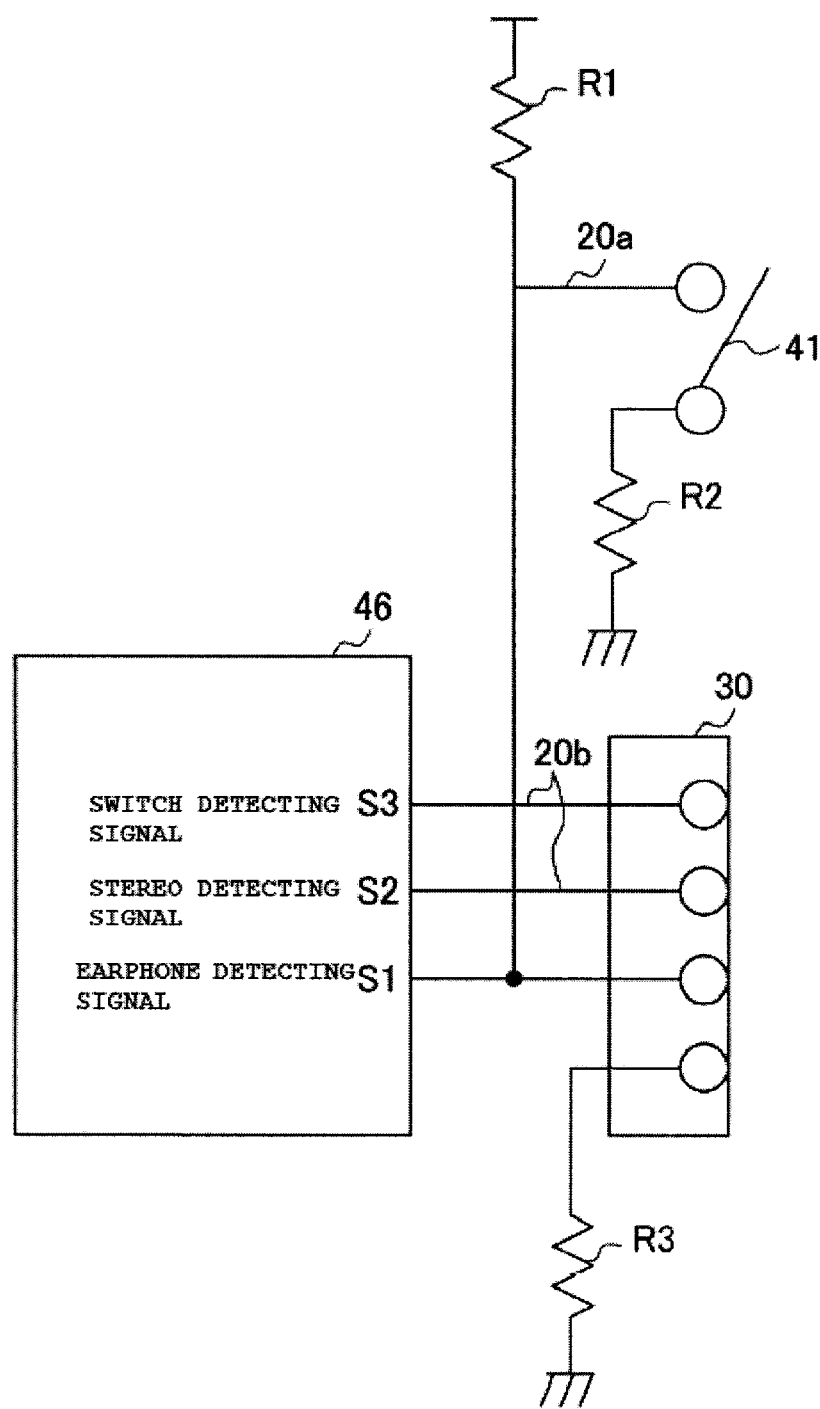
FIG. 4 is a schematic view illustrating a state where the earphone cap is separated from the earphone interface unit.
Figure 5:
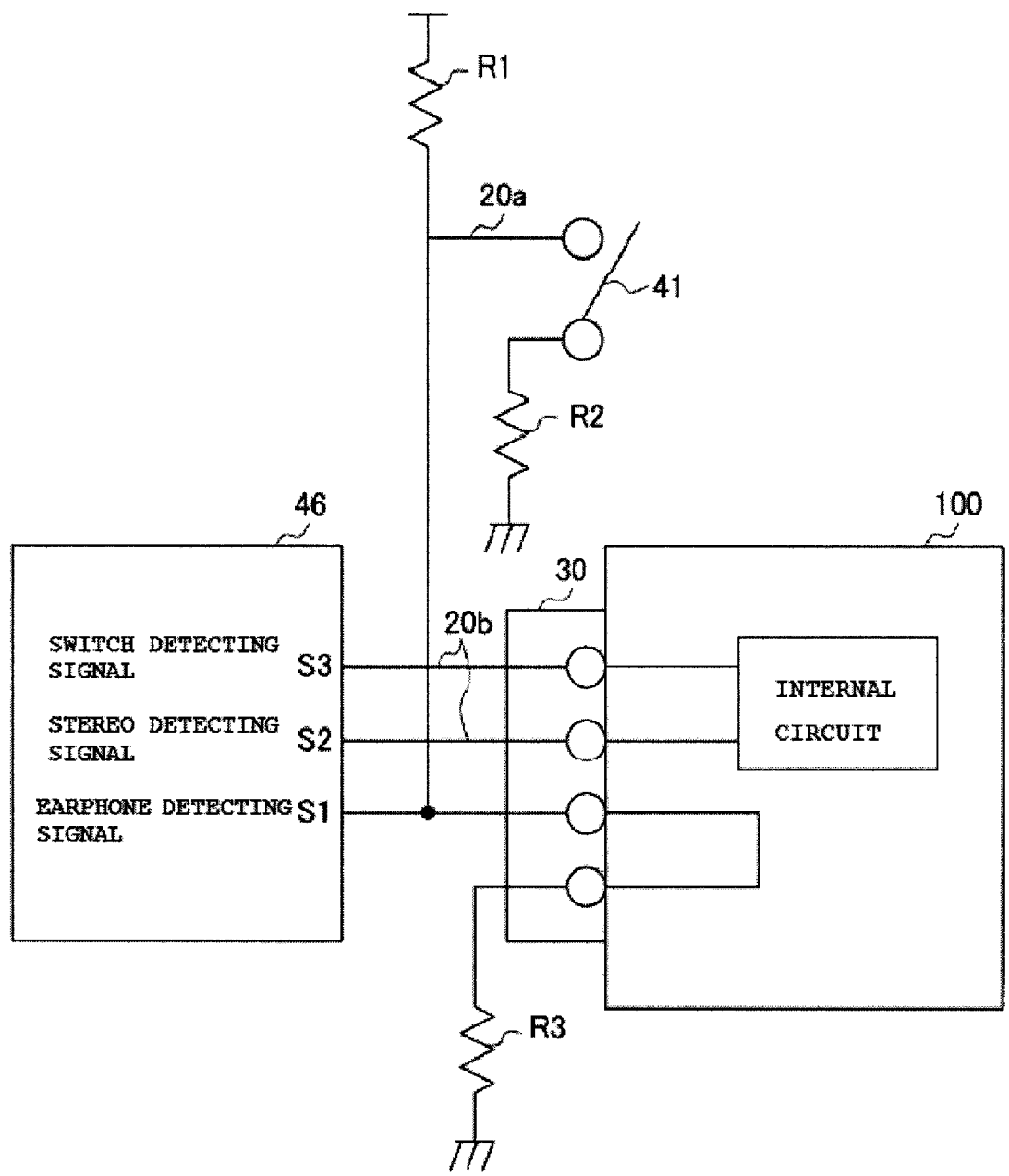
FIG. 5 is a schematic view illustrating a state where an earphone is connected to the earphone interface unit.

FIG. 3 is a view illustrating a state where the earphone cap 16 covers the earphone interface unit 30, FIG. 4 is a view illustrating a state where the earphone cap 16 is separated from the earphone interface unit 30, and FIG. 5 is a view illustrating a state where the earphone 100 is connected to the earphone interface unit 30. In FIGS. 3 to 5, resistors R1, R2 and R3 having resistances satisfying R1>R2 and R1>R3 are shown.

As shown in FIG. 3, when the earphone cap 16 is attached, the control unit 46 detects an earphone detecting signal S1 through the signal detecting line 20a as a negative logical state (Low) since resistances of the resistors R1 and R2 are in the relation of R1>R2, while it does not detect either a stereo detecting signal S2 or a switch detecting signal S3 because the stereo detecting line 20b is in an insulated state. Here, the earphone detecting signal S1 is used to detect whether the earphone 100 is connected or not and to detect the open/closed state of the earphone cap 16. Since the stereo detecting signal S2 and the switch detecting signal S3 are in a flowing state when the earphone 100 is not connected, whether the earphone 100 is connected or not can be detected by detecting the flowing state of these signals.

As shown in FIG. 4, when the earphone cap 16 is separated and the earphone 100 is not connected, the control unit 46 detects the earphone detecting signal from the signal detecting line 20a as a positive logical state (High), while it does not detect either the stereo detecting signal S2 or the switch detecting signal S3 because the stereo detecting line 20b is in an insulated state.

As shown in FIG. 5, when the earphone cap 16 is separated and the earphone 100 is connected, the control unit 46 detects the earphone detecting signal from the signal detecting line 20a as a negative logical state (Low) since the resistances of the resistors R1 and R3 are in the relation of R1>R3, while it does not detect either the stereo detecting signal S2 or the switch detecting signal S3 because the stereo detecting line 20b is in an electrically connected state.

When the control unit 46 determines that the logical state of the signal detecting line 20a indicates a state where the signal detecting line 20a is not electrically connected to the predetermined electric potential (GND) (state of FIG. 4 or FIG. 5), the control unit 46 determines whether the stereo detecting line 20b, which is a part of the earphone interface unit 30, is in an open state or not. If it is determined that the stereo detecting line 20b is not in an open state, the control unit 46 determines that the earphone 100 is connected to the earphone interface unit 30 (state of FIG. 5), whereas if it is determined that the stereo detecting line 20b is in an open state, the control unit 46 determines that the earphone 100 is not connected to the earphone interface unit 30 and the earphone cap 16 is not attached to the earphone interface unit 30 (state of FIG. 4).

Figure 6:
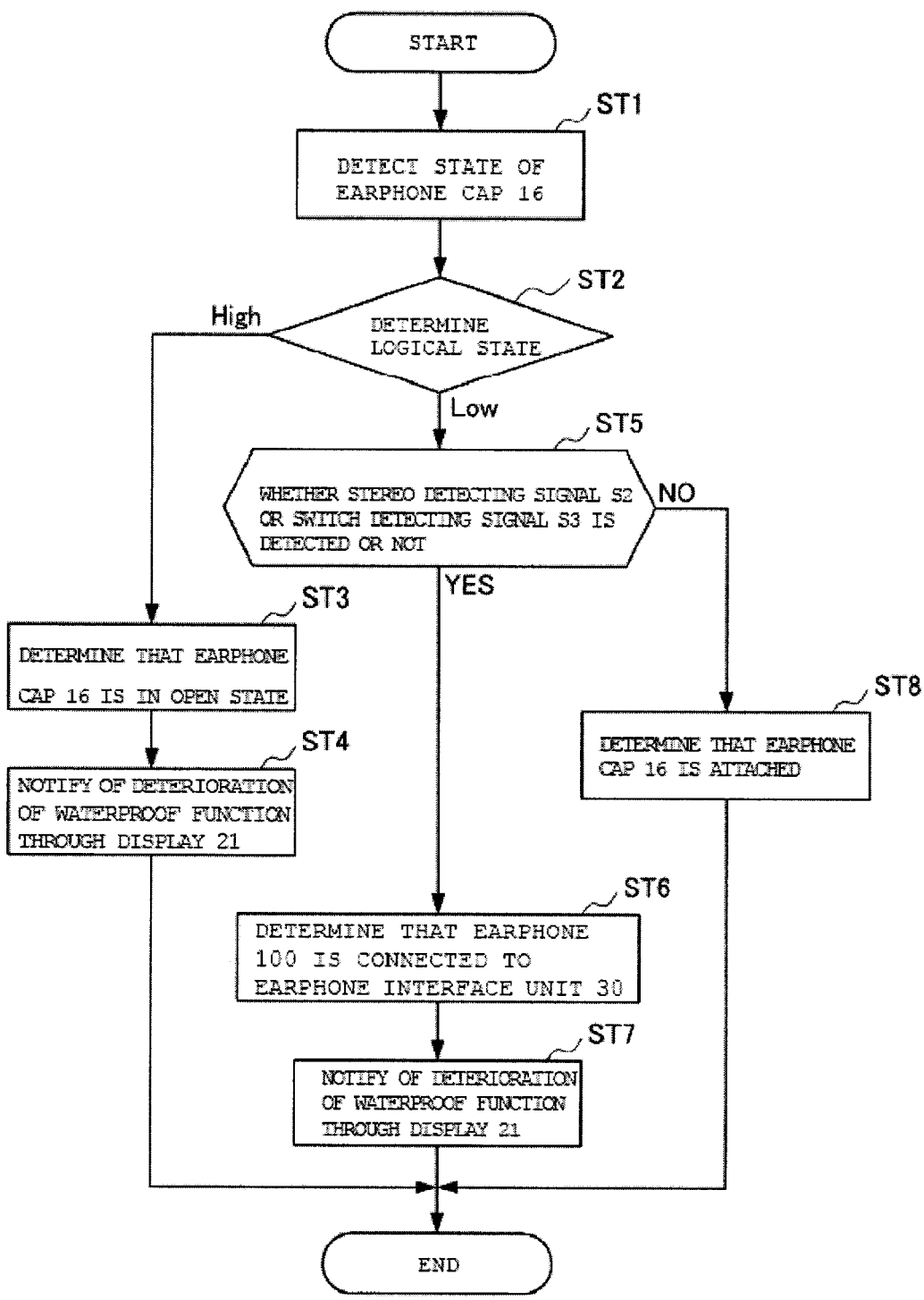
FIG. 6 is a flowchart illustrating a method for displaying a waterproof alert depending on the open/closed state of the earphone cap.

Next, a method for displaying a waterproof alert depending on the open/closed state of the earphone cap 16 will be described with reference to a flowchart shown in FIG. 6.

In step ST1, the control unit 46 detects the state of the earphone cap 16. Precisely, the control unit 46 detects a change in the logical state of the signal detecting line 20*a*.

In step ST2, the control unit 46 determines whether the logical state of the signal detecting line 20*a* detected in step ST1 is a positive logical state (High) or a negative logical state (Low). If the logical state is a positive logical state (High), the procedure proceeds to step ST3, whereas if the logical state is a negative logical state (Low), the procedure proceeds to step ST5.

In step ST3, the control unit 46 determines that the earphone cap 16 is in an open state (state of FIG. 4).

In step ST4, the control unit 46 controls deterioration notification of the waterproof function through the display 21.

In step ST5, the control unit 46 determines whether the stereo detecting signal S2 or the switch detecting signal S3 is detected or not. In the case where the stereo detecting signal S2 or the switch detecting signal S3 is detected (Yes), the procedure proceeds to step ST6, whereas in the case where the stereo detecting signal S2 or the switch detecting signal S3 is not detected (No), the procedure proceeds to step ST8.

In step ST6, the control unit 46 determines that the earphone 100 is connected to the earphone interface unit 30.

In step ST7, the control unit 46 controls deterioration notification of the waterproof function through the display 21. If waterproof integrity is guaranteed in a state where the earphone 100 is connected to the earphone interface unit 30, this step can be skipped.

In the exemplary embodiment of the present invention, since opening/closing of the earphone cap 16 is detected using the same signal detecting line 20*a*, an additional dedicated signal line is not required, whereby cost can be reduced, physical space efficiency is improved, and space can be saved.

In the exemplary embodiment of the present invention, in detecting an open/closed state of the earphone cap 16, a negative logical state (Low) indicates a closed state and a connected state of the earphone 100. Generally, since the normal state of the earphone cap is a closed state or a state where the earphone is connected, reactive current is consumed to detect an open/closed state of the earphone cap. In the exemplary embodiment of the present invention, a negative logical state indicates a normal state and reactive current does not flow in a normal state; thus current consumption for open/closed detection of the earphone cap 16 can be suppressed to a minimum.

In step ST8, the control unit 46 determines that the earphone cap 16 is attached. That is, in the portable telephone device 1 of the present invention, the fact that the earphone cap 16 is attached means that waterproof integrity is guaranteed.

Next, a method for displaying a waterproof alert depending on the open/closed state of the cap 17 in the portable telephone device 1 according to the exemplary embodiment of the present invention will be described.

Figure 7:
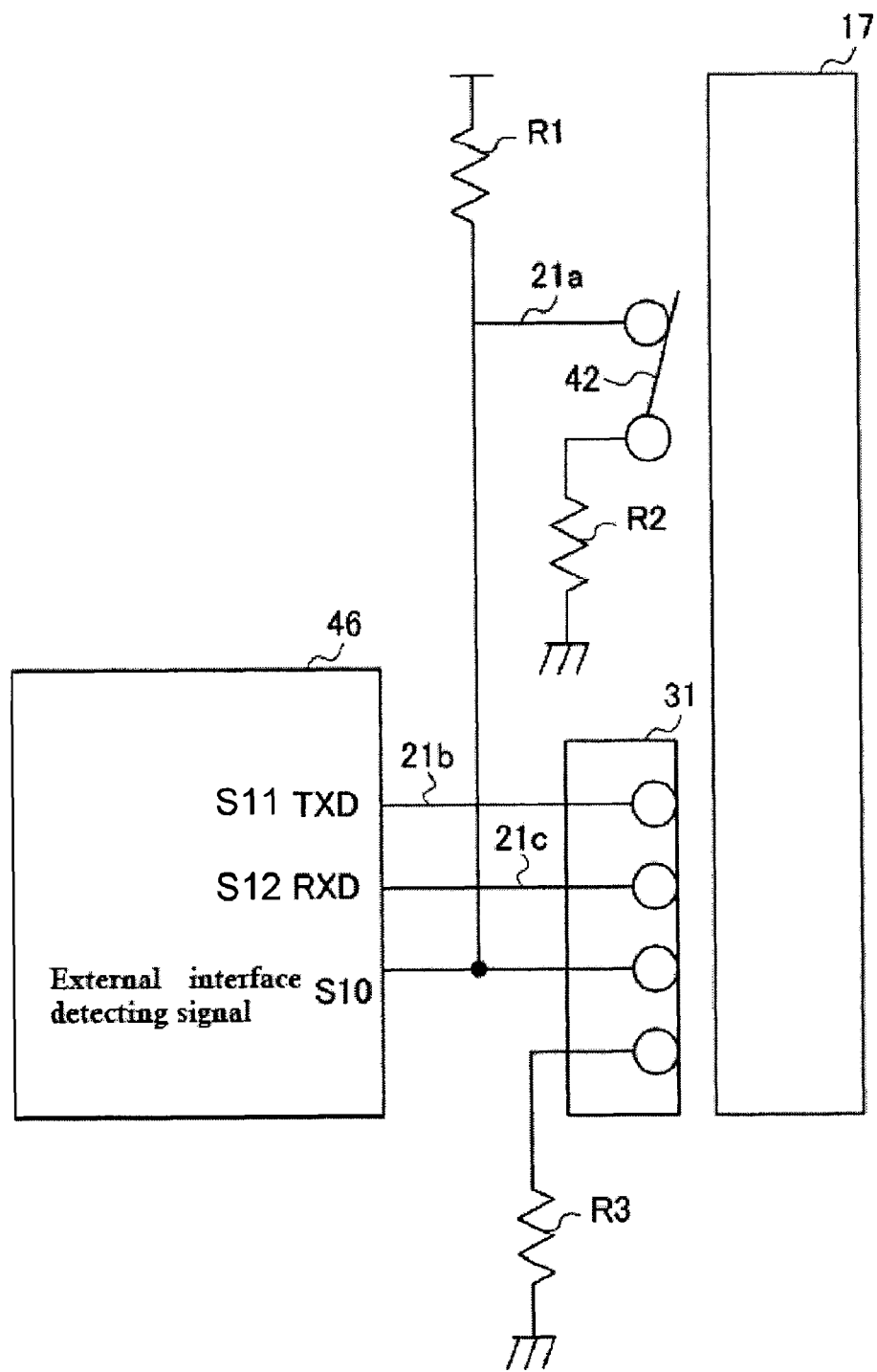
FIG. 7 is a schematic view illustrating a state where a cap covers an interface unit.
Figure 8:
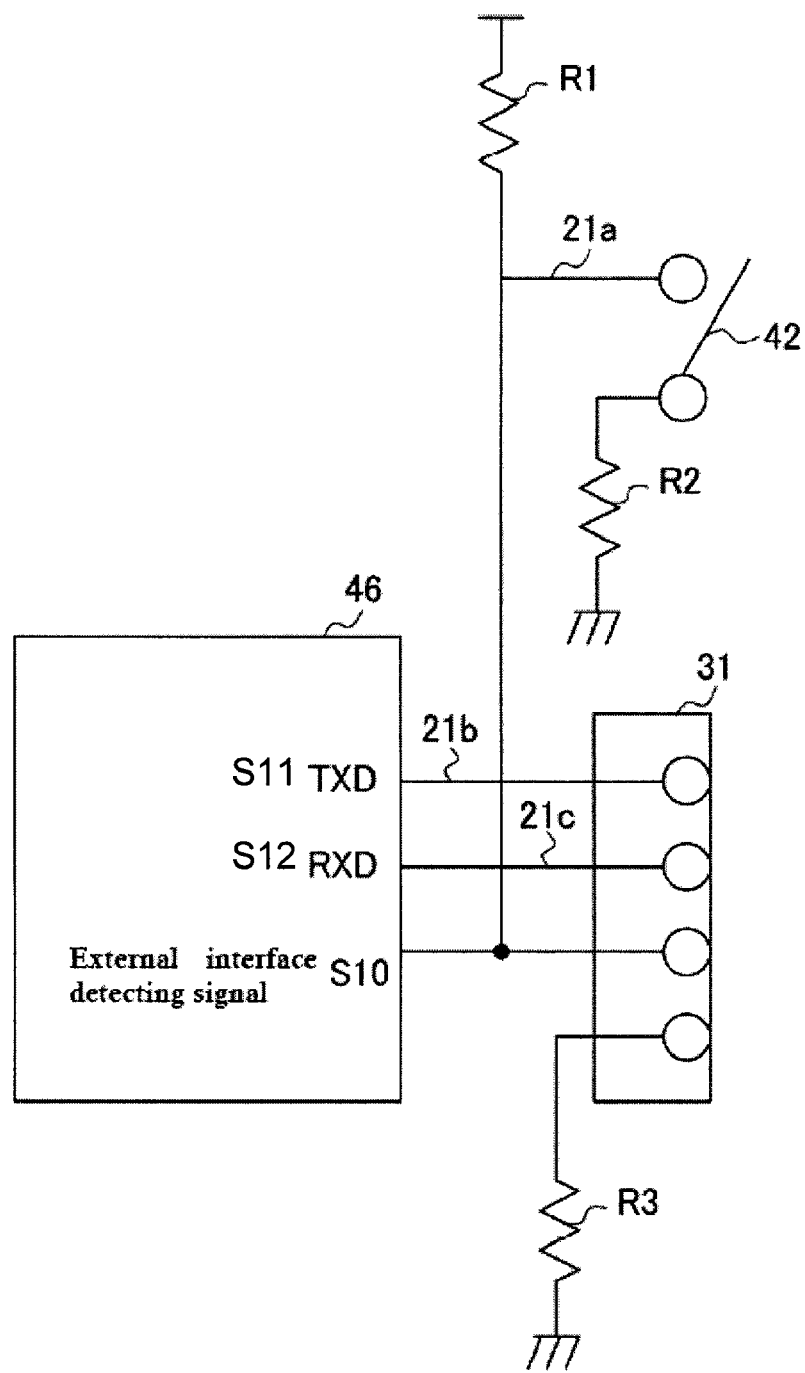
FIG. 8 is a schematic view illustrating a state where the cap is separated from the interface unit.
Figure 9:
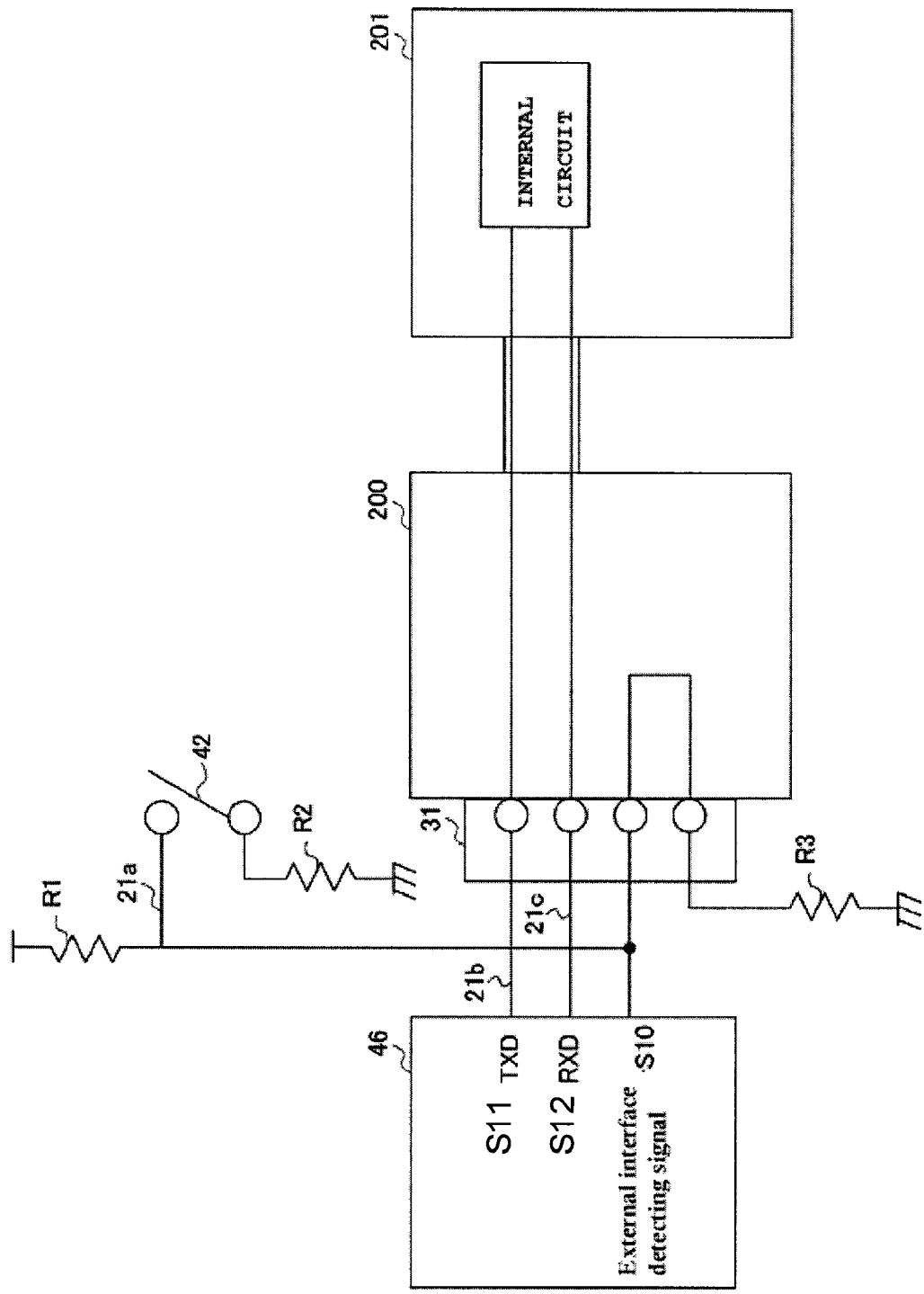
FIG. 9 is a schematic view illustrating a state where an external device is connected to the interface unit through an external interface.

FIG. 7 is a view illustrating a state where the cap 17 covers the interface unit 31, FIG. 8 is a view illustrating a state where the cap 17 is separated from the interface unit 31, and FIG. 9 is a view illustrating a state where an external device 201 is connected to the interface unit 31 through an external interface 200. In FIGS. 7 to 9, resistors R1, R2 and R3 having resistances satisfying R1>R2 and R1>R3 are shown.

As shown in FIG. 7, when the cap 17 is attached, the control unit 46 detects an external interface detecting signal S10 through the signal detecting line 21*a* as a negative logical state (Low) since resistances of the resistors R1 and R2 are in the relationship of R1>R2, while it does not detect an ACK signal (which is determined by a transmitting signal (TXD) S11 and a receiving signal (RXD) S12) because the signal output line 21*b* and the signal input line 21*c* are in an insulated state. Here, the external interface detecting signal S10 is used to detect whether the external interface 200 is connected or not and to detect the open/closed state of the cap 17.

As shown in FIG. 8, when the cap 17 is separated and the external interface 200 is not connected, the control unit 46 detects a signal from the signal detecting line 21*a* as a positive logical state (High), while it does not detect the ACK signal (which is determined based on the transmitted signal (TXD) S11 and the received signal (RXD) S12) because the signal output line 21*b* and the signal input line 21*c* are in an insulated state.

As shown in FIG. 9, when the cap 17 is separated and the external interface 200 is connected, the control unit 46 detects a signal obtained from the signal detecting line 21*a* as a negative logical state (Low) since resistances of the resistors R1 and R3 are in the relation of R1>R3, while it does not detect the ACK signal (which is determined based on the transmitted signal (TXD) S11 and the received signal (RXD) S12) because the signal output signal 21*b* and the signal input line 21*c* are in an electrically connected state.

When it is determined that the logical state of the signal detecting line 21*a* is changed from a state where the detecting line 21*a* is electrically connected to the predetermined electric potential (GND) to a state where the detecting line 21*a* is not electrically connected to the predetermined electric potential (GND) (state of FIG. 8 or FIG. 9), the control unit 46 outputs a predetermined signal (transmitted signal (TXD) S11) to the signal output line 21*b*, which is a part of the interface unit 201 for transmitting a signal to the external device 201. If a response (received signal (RXD) S12 inputted through the signal input line 21*c*) to the predetermined signal is detected, the control unit 46 determines that the external device 201 is connected to the interface unit 31 (state of FIG. 9), whereas if the response (receiving signal (RXD) S12 inputted through the signal input line 21*c*) to the predetermined signal (transmitted signal (TXD) S11) is not detected, the control unit 46 determines that the external device 201 is not connected to the interface unit 31 and the cap 17 is not attached to the interface unit 31 (state of FIG. 8).

Figure 10:
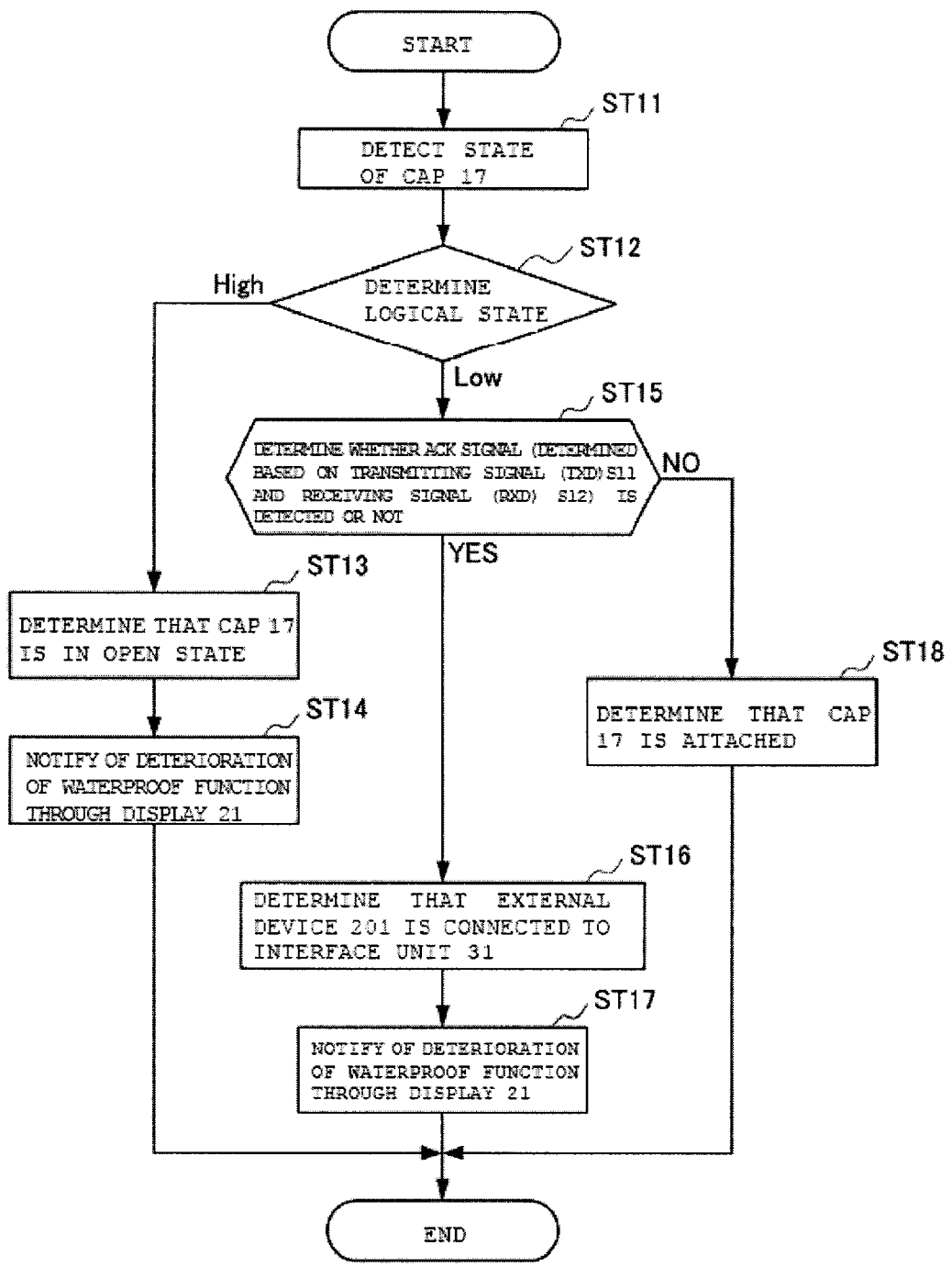
FIG. 10 is a flowchart illustrating a method for displaying a waterproof alert depending on the open/closed state of the cap.

Next, a method for displaying a waterproof alert depending on the open/closed state of the cap 17 will be described with reference to a flowchart shown in FIG. 10.

In step ST11, the control unit 46 detects the state of the cap 17. In detail, the control unit 46 detects a change in the logical state of the signal detecting line 21*a*.

In step ST12, the control unit 46 detects whether the logical state of the signal detecting line 21*a* detected in step ST11 is a positive logical state (High) or a negative logical state (Low). If the logical state is positive (High), the procedure proceeds to step ST13, whereas if the logical state is negative (Low), the procedure proceeds to step ST15.

In step ST13, the control unit 46 determines that the cap 17 is in an open state (state of FIG. 8).

In step ST14, the control unit 46 controls deterioration notification of the waterproof function through the display 21.

In step ST15, the control unit 46 determines whether the ACK signal (which is determined based on the transmitting signal (TXD) S11 and the receiving signal (RXD) S12)) is detected or not. The control unit 46 determines whether the external device 201 is connected or not depending on whether a communication can be established by the transmitting signal (TXD) S11 and the receiving signal (RXD) S12 within a predetermined time period or not. In the case where the ACK signal is detected (Yes), the procedure proceeds to step ST16, whereas in the case where the ACK signal is not detected (No), the procedure proceeds to step ST18.

In step ST16, the control unit 46 determines that the external device 201 is connected to the interface unit 31.

In step ST17, the control unit 46 controls deterioration notification of the waterproof function through the display 21. If waterproof integrity is guaranteed in a state where the external device 201 is connected to the interface unit 31, processing for this process can be skipped.

In step ST18, the control unit 46 determines that the cap 17 is attached. That is, in the portable telephone device 1 of the present invention, the fact that the cap 17 is attached means that waterproof integrity is guaranteed.

In the exemplary embodiment of the present invention, since opening/closing of the cap 17 is detected using the same signal detecting line 21a, an additional dedicated signal line is not required, whereby the cost can be reduced, physical space efficiency is improved, and space can be saved.

In the exemplary embodiment of the present invention, in detecting the open/closed state of the cap 17, a negative logical state (Low) indicates a closed state and a connected state of the external interface 200. Generally, since the normal state of the cap is a closed state or a state where the external interface is connected, similar to the earphone cap, reactive current is consumed to detect the open/closed state of the cap. In the exemplary embodiment of the present invention, a negative logical state indicates a normal state and reactive current does not flow in the normal state; thus current consumption for open/closed detection of the cap 17 can be suppressed to a minimum.

As described above, the portable telephone device 1 according to the present invention detects the open/closed state of the earphone cap 16 or the cap 17 and notifies deterioration of the waterproof function through the display 21 when the earphone cap 16 or the cap 17 is in an open state with a simple configuration, thereby preventing the portable telephone device 1 from being submerged in water when the waterproof function is deteriorated. In the portable telephone device 1, deterioration of the waterproof function may be notified by, for example, outputting a predetermined sound through a speaker rather than the display 21. Alternatively, in the portable telephone device 1, deterioration of the waterproof function may be notified by, for example, an emission of a light emitting diode (LED) or a vibration of a vibrator.

Also, the portable telephone device 1 according to the present invention is configured to detect the open/closed state of the earphone cap 16 or the cap 17 when the logical state is changed and thereby having an advantage in that electrical power is not consumed in a state where the earphone cap 16 and the cap 17 are attached.

Figure 11:
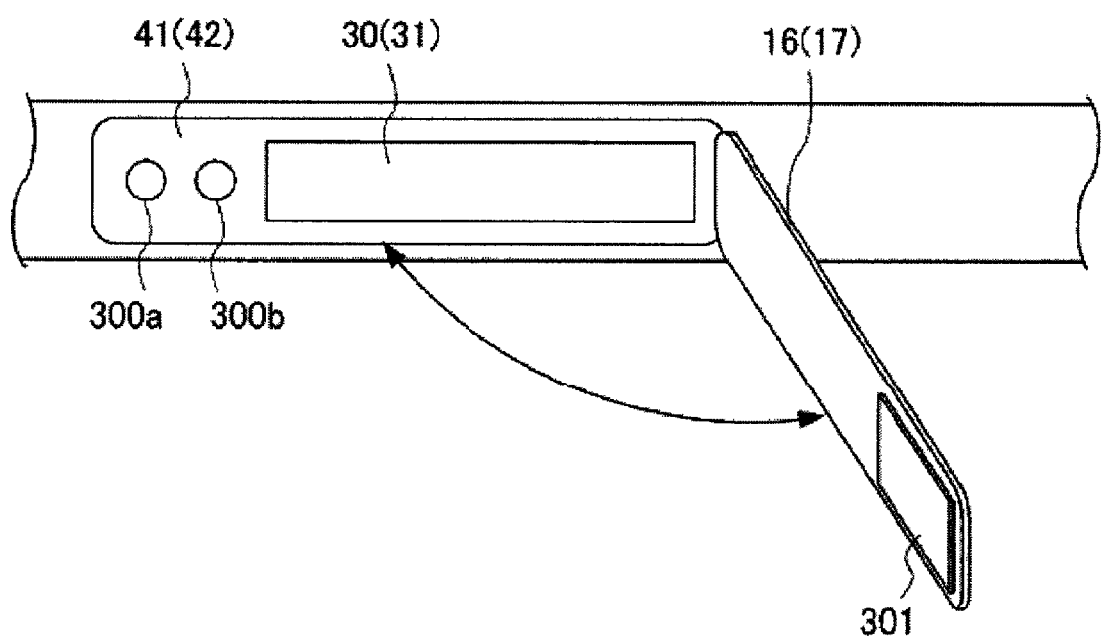
FIG. 11 is a schematic view illustrating the peripheral edge of an opening portion of the earphone interface unit or the interface unit.

Turning to FIG. 11, in an alternative embodiment, terminals 300a and 300b kept at the predetermined electric potential (GND) may be provided in the peripheral edge of the opening portion of the earphone interface unit 30 or the interface unit 31 at a location which can be covered by the earphone cap 16 or the cap 17; and a conductor 301, which is connected to the signal detecting lines 20a and 21a through a mounting portion of the housing, may be provided on an inner surface of the earphone cap 16 or the cap 17. In this configuration, the conductor 301 may be configured to contact the terminals 300a and 300b so that the terminal 300a and the terminal 300b are electrically connected when the earphone cap 16 or the cap 17 is attached. In this configuration, the conductor 301 constitutes a part of the earphone cap open/closed switch 41 or the cap open/closed switch 42.

Also, the exemplary embodiment of the present invention has been described focusing on detection of the open/closed state of the earphone cap 16, which covers the earphone interface unit 30 to which the earphone is connected, and the cap 17, which covers the interface unit 31 for communicating with the external device, but the present invention is not limited to this. For example, the portable telephone device 1 may be configured to detect the open/closed state of a battery cap, and to notify of deterioration of the waterproof function through the display 21 in the case of an open state. Also, the portable telephone device 1 may be configured to detect the open/closed state of a cap, which covers a removable memory card, and to notify of deterioration of the waterproof function through the display 21 in the case of an open state.

In the above-described configuration, a switch for detecting the opening/closing of a cap, which covers a memory card, may be connected to a signal line changing its logical state depending on whether a memory card is attached or detached and thus is used to detect the presence of a memory card, similar to the signal detecting line 20a for the earphone interface unit 30 and the signal detecting line 21a for the interface unit 31.

What is claimed is:

1. A portable electronic device, comprising:
    an interface unit configured to be connected to an external device;
    a housing provided with the interface unit;
    a cap placed in a location allowing for the covering of the interface unit and covering the interface unit when attached to the housing;
    a signal detecting line placed in the interface unit and connected to a predetermined electric potential when the external device is connected to the interface unit;
    a switch which electrically connects the signal detecting line to the predetermined electric potential when the cap is attached to the housing and electrically disconnects the signal detecting line from the predetermined electric potential when the cap is separated from the housing; and
    a control unit connected to the interface unit and configured to determine whether the signal detecting line is electrically connected to the predetermined electric potential or not.

2. The portable electronic device according to claim 1, wherein the control unit determines whether the signal detecting line is electrically connected to the predetermined electric potential or not when the control unit detects a change in a logical state of the signal detecting line.

3. The portable electronic device according to claim 1, wherein the interface unit comprises a signal input line connected to the external device and a signal output line connected to the external device, and the control unit outputs a certain signal to the signal output line when determining that the logical state of the signal detecting line indicates a state where the signal detecting line is not electrically connected to the predetermined electric potential, wherein the control unit determines that the external device is connected to the interface unit when a response to the certain signal through the signal input line is detected, and determines that the external device is not connected to the interface unit and the cap is not attached to the housing when the response is not detected.

4. The portable electronic device according to claim 1, wherein the interface unit comprises a stereo detecting line connected to the external device, and the control unit determines whether the stereo detecting line is in an open state or not when the control unit determines that the logical state of the signal detecting line indicates a state where the signal detecting line is not electrically connected to the predetermined electric potential, wherein the control unit determines that the external device is connected to the interface unit when the stereo detecting line is not in an open state, and determines that the external device is not connected to the interface unit and the cap is not attached to the housing when the stereo detecting line is in an open state.

5. The portable electronic device according to claim 1, wherein the switch comprises a terminal placed in a location capable of being covered by the cap when the cap is attached to the housing and having the predetermined electric potential; and a conductor placed on an inner surface of the cap and connected to the signal detecting line, wherein the conductor contacts the terminal when the cap is attached to the housing, so that the signal detecting line is electrically connected to the predetermined electric potential.

* * * * *